(12) United States Patent
Jackson et al.

(10) Patent No.: US 6,643,628 B1
(45) Date of Patent: Nov. 4, 2003

(54) CELLULAR AUTOMATA NEURAL NETWORK METHOD FOR PROCESS MODELING OF FILM-SUBSTRATE INTERACTIONS AND OTHER DYNAMIC PROCESSES

(75) Inventors: Allen G. Jackson, Kettering, OH (US); Mark D. Benedict, Worthington, OH (US); Steven R. LeClair, Springboro, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/353,697

(22) Filed: Jul. 14, 1999

Related U.S. Application Data

(60) Provisional application No. 60/092,840, filed on Jul. 14, 1998.

(51) Int. Cl.$^7$ .............................................. G06F 15/18
(52) U.S. Cl. ...................................................... 706/25
(58) Field of Search ............................ 706/25, 13, 29; 704/208; 382/209; 700/17

(56) References Cited

U.S. PATENT DOCUMENTS

| | | | | |
|---|---|---|---|---|
| 5,140,670 A | * | 8/1992 | Chua et al. | 706/29 |
| 5,602,964 A | * | 2/1997 | Barrett | 706/25 |
| 5,664,066 A | * | 9/1997 | Sun et al. | 706/25 |

OTHER PUBLICATIONS

Constructing Deterministic Finite–State Automata in Recurrent Neural Networks, Christian W. Omlin, C. Lee Giles, Journal of the ACM vol. 43, No. 6, Nov. 1996, pp. 937–972.*

Introduction & Overview of "Artificial Life"—Evolving Intelligent Agents for Modeling & Simulation, A Martin Wildberger, Proceeding of the 1996 Winter Simulation Conference.*

How a SIMD machine can implement a complex cellular automaton? A case study: von Neumann's 29–state cellular automaton, Jacqueline Signorini, 1989 ACM, pp. 176–186.*

Cell–Based Computer Models in Development Biology, Pankaj Agarwal, Sep. 1993, Dissertation for Doctor of Philosophy, Department of Computer Science New York University.*

* cited by examiner

*Primary Examiner*—Ramesh Patel
*Assistant Examiner*—Michael B. Holmes
(74) *Attorney, Agent, or Firm*—Fredric L. Sinder; Thomas L. Kundert

(57) ABSTRACT

A cellular automata neural network method for process modeling of film-substrate interactions utilizes a cellular automaton system having variable rules for each cell. The variable rules describe a state change algorithm for atoms or other objects near a substrate. The state change algorithm is used to create a training set of solutions for training a neural network. The cellular automaton system is run to model the film-substrate interactions with the neural network providing the state change solutions in place of the more computationally complex state change algorithm to achieve real-time or near real-time simulations.

3 Claims, 1 Drawing Sheet

CELLULAR AUTOMATA NEURAL NETWORK METHOD FOR PROCESS MODELING OF FILM-SUBSTRATE INTERACTIONS AND OTHER DYNAMIC PROCESSES

CROSS-REFERENCE TO RELATED APPLICATIONS

This application claims priority under 35 U.S.C. §119(e) from U.S. provisional application No. 60/092,840, filed Jul. 14, 1998, by applicants Allen G. Jackson, Mark D. Benedict and Steven R. LeClair, titled Cellular Automata Neural Network Method for Process Modeling of Film-Substrate Interactions. The invention description contained in that provisional application is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to mathematically modeling complex physical processes, and more specifically to computationally tractable methods for mathematically modeling film-substrate interactions during formation and growth of thin films.

Simulation of formation and growth of thin films is currently accomplished by use of quantitative models utilizing physics and chemistry theories based on quantum mechanical principles. These "first principle" approaches require detailed knowledge of the elements involved in the interactions, energies of interaction and parameters associated with the structure and geometry of the substrate and vapor systems. Casting these variables into a form suited to the Hamiltonian required in the solution of the Schrodinger equation governing the atomic behavior of the elements in a system to be modeled is extremely difficult. Solution of the differential equations is time-consuming even on supercomputers. Other approaches such as molecular dynamics require a detailed statement of the equations of motion of the atoms involved. This limits the size of the substrate and vapor atoms to be deposited to a few thousand atoms for practical considerations related to computational time. Monte Carlo methods, while not as demanding in terms of details of each atom, nevertheless require many integrations and iterations on quantitative functions describing the behavior of atoms in the systems. As a result, it too is limited to a few thousand atoms in order to keep the computational times plausible.

Thus it is seen that there is a need for computationally tractable methods for simulating formation and growth of thin films and for simulating other physical processes.

It is, therefore, a principal object of the present invention to provide a computationally tractable method for modeling formation and growth of thin films, particularly as an example of a method that can be applied to any physical process.

It is a feature of the present invention that it facilitates use of computationally complex processes by modeling the processes with a neural network.

It is an advantage of the present invention that it greatly increases the computational speed of a modeling process.

It is another advantage of the present invention that it reduces problem solutions which now require massively parallel computing systems to a single desktop computer.

These and other objects, features and advantages of the present invention will become apparent as the description of certain representative embodiments proceeds.

SUMMARY OF THE INVENTION

In accordance with the foregoing principles and objects of the present invention, a new method for modeling dynamic physical systems is described. The unique discovery of the present invention is that a computationally very fast model can be made with a hybrid cellular automaton/neural network where selected cellular automaton algorithms, or other computationally complex computational-subprocesses, are replaced with neural networks where the neural network was trained from a solution set previously generated by the now replaced computationally complex subprocess. In the case of modeling of film-substrate interactions, this approach substantially increases the number of atoms per second that can be modeled.

Accordingly, the present invention is directed to a method for modeling thin-film formation and growth, comprising the steps of modeling the thin-film formation and growth with a cellular automaton system having variable rules for each cell, wherein the rules describe a state change algorithm, creating a training set of solutions for a neural network from the state change algorithm, and using the trained neural network in place of the state change algorithm during operation of the cellular automaton system.

The present invention is also directed to a method for modeling a dynamic process, comprising the steps of creating a model of the dynamic process with a cellular automaton system having variable rules for each cell, wherein the rules are described by an algorithm, creating a training set of solutions for a neural network from the algorithm, training the neural network with the training set of solutions, and using the trained neural network in place of the algorithm during operation of the cellular automaton system.

The present invention is still further directed to a method for modeling a dynamic process, comprising the steps of creating a model of the dynamic process with a computationally complex method, wherein the computationally complex method includes a computationally complex subprocess, creating a training set of solutions for a neural network from the computationally complex subprocess, training a neural network with the training set of solutions, and using the trained neural network in place of the computationally complex subprocess during operation of the computationally complex model.

BRIEF DESCRIPTION OF THE DRAWINGS

The present invention will be more clearly understood from a reading of the following detailed description in conjunction with the accompanying drawing wherein.

DETAILED DESCRIPTION

Figure 1:
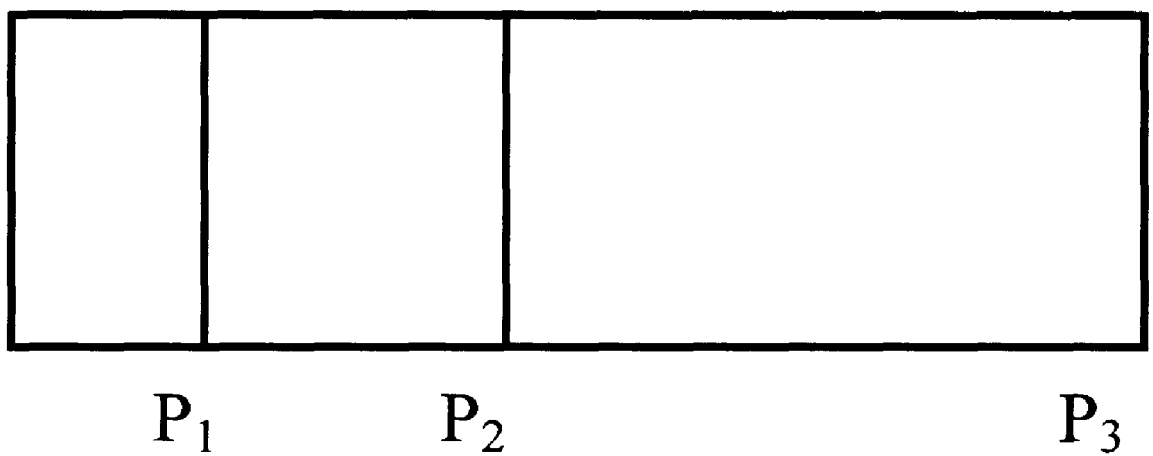
FIG. 1 shows a probability distribution diagram for determining the probability of a state change, such as from a vapor to a solid.

This invention addresses the problem of computational tractability of atomic or molecular modeling by approaching the interaction of atoms from a local interaction point of view, allowing self-organizing interactions to determine the course of the simulation. This is accomplished by using a generalized cellular automaton method together with a state change algorithm and a neural network to reduce and recast the computational aspects simulating a dynamic model of interatomic collisions into two parts: training and execution. The training portion is required to enable a neural network to learn a model and approximate the behavior of the model, that is, predict the state of an atom on collision with a surface. The execution part includes the state change algorithm operating on a cellular automaton (CA)-like discrete space that uses the neural network for prediction of the state based on inputs from the state change algorithm. The result is a rapid determination of the state of the atom from the vapor on the surface, producing an accelerated visual display of the formation and growth of a thin film.

Modeling thin-film growth is typically performed with quantitative models, but the penalty is often computational intractability. Although these models perform well for limited cases, performance degrades with increased complexity, for example, quantum wells, organic films, those with various defects and grain boundaries—hence an interest in seeking more computationally efficient alternatives. One such alternative is cellular automata (CA) or CA-like methods to not only improve tractability, but also to integrate multiple modeling paradigms (physical, thermodynamic, and chemical) and scales (from "first principle" type interactions, i.e., interatomic collisions @$10^{-13}$ seconds to process temperature changes @$10^{-3}$ seconds) into one framework.

A cellular automaton is a system that operates using rules that relate neighbors of an object. The context of this system is a discrete space consisting of locations for each cell. This cellular space therefore consists of identical finite-state machines, each of which obeys the same set of rules locally. The neighbors with which an object interacts is defined for each system. The interactions are local, that is, they do not involve interactions with objects outside of the defined neighborhood. Hence, there are two parts to a CA: a cellular space containing individual cells that have a defined state associated with them and a transition rule(s) for updating the state of the cell. The system updates on receipt of an update signal. In principle, all objects are updated simultaneously.

There are many advantages to a CA approach. The time steps for first principle type calculations are orders of magnitude too small for practical consideration. Monte Carlo methods work well, but they too become intractable when process times are on the order of seconds. Large numbers of atoms ($10^{23}$) require large, often parallelized, computational machines to accomplish these calculations in a reasonable time, e.g., five minutes or adjustable between 2–10 times faster than real-time. Because such a large number of atoms cannot be handled in such a short time, new ways of viewing the problem are required.

CAs are also designed to improve tractability via parallelization in software, and sometimes, but not necessarily hardware. CAs are defined as parallel implementations of a finite state machine (computer processor) in software. In addition, CAs offer a second advantage, one which distinguishes them from parallel computing machines. CAs operate on linearized models or sets of rules formulated in IF-THEN statements that include not only symbolic but also mathematical expressions, allowing for the combination of multiple models and/or extensive but simple adaptation of the models. Structures that contain sub-rules can be easily formulated. The major effort involved in such an approach is the formulation of the rules from physical, thermodynamic and chemical principles.

Such an automaton is extremely versatile in accommodating nearly any film-substrate molecular modeling context. But, typical CAs require that the rules be identical in each cell, a very limiting capability when simulating film-substrate interfaces. By relaxing this requirement and allowing rules to vary among the cells, a system can be created that contains behavior associated with a substrate, a vapor and a source of objects or atoms. The rules at the interface between the substrate and the vapor are special because they incorporate the substrate-vapor interactions that lead to the formation of a film at the atomic or object level. This extension of the cellular automaton is not widely used or known. Stochastic CA have been described, variable geometry cellular space has also been utilized, but application of variable rule and cellular space to the formation of films from atomic or higher level interactions has not been described in the prior art.

At the surface of a substrate, the vapor atoms or objects interact with substrate atoms or objects, resulting in a change in state of the vapor atoms from vapor to solid. This state change is similar to the thermodynamic change of state that occurs on condensation of a vapor to a liquid or solid. Such a state change at the surface must be viewed more generally because the new state is not easily defined as a solid or a liquid. The state is the adsorbed state.

The rules governing this change of state are constructed from physical and chemical principles of binary atomic or molecular interactions. Covalent, ionic, metallic, van der Waal or hydrogenic bonding are possible, and are considered local interactions involving only neighbors of the vapor atom or object. Well-known simple models of interactions are the Stranski models and derivatives in which the interactions are considered in terms of energy wells that capture the atoms or objects. These two can be combined by a barrier energy which may be positive or negative. The interactions are then considered in terms of a collection of the barriers encountered.

In a large collection of atoms, the interactions can be considered in terms of a reaction rate, which can be written as an Arrhenius equation as $$\text{rate} = A \exp[-\text{Energy}/kT],$$

where Energy is the barrier energy associated with changing from state 1 to state 2, k=Boltzman constant, and T=absolute temperature. The pre-exponential term A is called the jump frequency. This form of the equation is also interpreted as a probability of changing state, the pre-exponential factor then being equivalent to the probability in the absence of a barrier. Thus, the Arrhenius rate equation is rewritten as a probability:

$$p_{12} = A_{12} \exp[-E_{12}/kT],$$

where $p_{12}$ is the probability of changing from state 1 to state 2 and the "12" subscripts connote a similar state change. This approach has been applied for many years in the form of the Metropolis Algorithm.

The probability that a site will change its state from I to j is a transition probability, $S_{ij}$, and the probability that the state is in state I is $p_i$. The assumption that is made is that the product of the transition probability with the state probability is preserved, that is, $$S_{ij}p_i = S_{ji}p_j, \text{ transition}_p i \text{ to } j \times \text{state}_p i = \text{transition}_p \text{ from } j \text{ to } I \times \text{state}_p j$$

If the barrier energy of the states can be represented as $$\exp[-(E_j - E_i)/kT],$$

where $E_j=F_i$ represents the barrier energy (going from i to j), then the Metropolis method states that the ratio of the probabilities is just this function:

$$S_{ij}/S_{ji}=p_j/p_i=\exp[-(E_j-E_i)/kT]$$

This equally implies that the transition probabilities are of the form $$S_{ij}=1 \text{ if } E_j-E_i<0$$

$$\exp[-(E_j-E_i)kT] \text{ if } E_j-E_i>0$$

The state energy is determined by the condition that state I goes to state j if $p_i$ is some arbitrary fraction of $p_j$. This rule is implemented by choosing a random number in [0,1] and multiplying it by $p_i$ to set $p_j$. If $p_j<\exp[-(E_j-E_i)/kT]$, then the state changes to j.

By applying the Metropolis Algorithm to film generation as described next, the concept is extended from the rate of reaction and transition probability basis to the basis for atom-atom or object-object interactions during the formation of a thin film. Thus, this approach has been applied to the possible state changes at the surface when an atom comes into contact with a site on the surface. A collection of possible site configurations has been considered that contains those configurations with the highest potential for inducing a state change. Each configuration has a barrier energy associated with it and therefore it has a probability as well.

To create a rule that considers these configuration probabilities, all the probabilities are considered, summed and then normalized each one to the sum, producing a set of probabilities in the interval [0,1]. Next, a set of probabilities is derived from these that divides the [0,1] interval into sections. This is done by taking the first probability and marking its value as the first boundary above 0. The next boundary is generated by adding this first boundary value to one of the remaining probabilities. This is continued until all the probabilities are exhausted. The resulting diagram, shown in FIG. 1, represents probabilities for state changes corresponding to barriers in the model. The algorithm for determining the state change is to choose a random number in [0,1] and compare it with the diagram just created. Depending on the value of the random number, a given state change takes place. The range in each region is determined by the barrier energy, e.g., a strong bond will cover a wide range in the diagram and will be more probable than a weak bond. In addition, these boundaries will be temperature dependent through the exponential function.

This method is exemplified in the following example. Suppose there are three possible states with probabilities $p_1$, $p_2$ and $p_3$ calculated from barrier energies $E_1$, $E_2$ and $E_3$. The conversion to the probability diagram is accomplished by the following:

$$p_n=p_1+p_2+p_3$$

$$p'_1=p_1/p_n, \text{ [first boundary]}$$

$$p'_2=p_2/p_n+p'_1, \text{ [second boundary]}$$

$$p'_3=p_3/p_n+p'_2, \text{ [third boundary; in this case=1]}$$

Thus, an atom on the surface will change its state to configuration $p_2$ if $p'_1<p_{rand}<p'_2$.

If this were the only consideration, then the algorithm would be complete. However, there are more subtle effects that must be included that model the physical state and configurations at the surface. For example, vacancies may be present or walls and cliffs (steps and ledges). These represent states as well. Also, the occupancy of the neighborhood of the atom requires a decision algorithm because of the local interaction nature of the state change. This means that there is a decision network that must be developed that considers these configurations and generate probabilities of interaction at the appropriate steps.

The described collection of algorithms constitutes the state change algorithm.

A neural network is introduced at this point to autonomously approximate the functional mapp$_i$ ng of input to output variables. An example of such input and output variables for an illustrative material such as Gallium Arsenide (GaAs) is as follows.

The input variables are:

Variable 1—temperature of substrate (700–1500° C.)—assumes temperature range for epitaxial growth of GaAs.
Variable 2—neighbor types (A, B, AB, AAB, ABB)—assumes a binary compound substrate such as GaAs.
Variable 3—number of neighbors (1, 2, 3)—assumes the number of neighboring atoms is predominant and irrespective of their relative positions.
Variable 4—random variable ($P_{rand}$), as discussed earlier, to account for the probability of an atom changing state once on the substrate surface.
Variable 5—random variable (PAA) denoting the probability of an atom achieving an AA type bond, for example, Ga—Ga or As—As.
Variable 6—random variable (PAB) denoting the probability of an atom achieving an AB bond, for example, Ga—As.

The single output variable is:

Variable 1—state of an impinging atom at the surface (vapor, adsorbed, bonded AB, bonded AA).

Using the earlier described state-change algorithm, examples of particular input conditions and their corresponding output state are generated as illustrated in the following table.

Table of Exemplars

| T (° K.) | Type | No. | $\rho_{rand}$ | $\rho_{aa}$ | $\rho_{ab}$ | State |
|---|---|---|---|---|---|---|
| 1084 | AB | two | 0.95 | 0.43 | 0.79 | adsorbed |
| 825 | AB | two | 0.91 | 0.39 | 0.73 | adsorbed |
| 1220 | A | one | 0.2 | 0.71 | 0.00 | AA bonded |
| 927 | AB | two | 0.14 | 0.4 | 0.75 | AA bonded |
| 1249 | AB | two | 0.78 | 0.45 | 0.83 | AB bonded |
| 1133 | A | one | 0.18 | 0.69 | 0.00 | AA bonded |
| 1094 | AAB | three | 0.94 | 0.58 | 0.28 | adsorbed |
| 898 | A | one | 0.91 | 0.61 | 0.00 | adsorbed |
| 731 | A | one | 0.14 | 0.57 | 0.00 | AA bonded |
| 878 | B | one | 0.83 | 0 | 0.60 | adsorbed |
| 1198 | A | one | 0.68 | 0.71 | 0.00 | AA bonded |
| 753 | B | one | 0.91 | 0 | 0.57 | adsorbed |
| 816 | B | one | 0.69 | 0 | 0.59 | adsorbed |
| 930 | A | one | 0.3 | 0.62 | 0.00 | AA bonded |
| 778 | AB | two | 0.01 | 0.38 | 0.72 | vapor |
| 1353 | B | one | 0.5 | 0 | 0.76 | AB bonded |
| 1393 | A | one | 0.61 | 0.75 | 0.00 | AA bonded |
| 1154 | AB | two | 0.07 | 0.44 | 0.81 | vapor |
| 1247 | A | one | 0.69 | 0.72 | 0.00 | AA bonded |
| 1124 | B | one | 0.59 | 0 | 0.68 | AB bonded |
| 1309 | AB | two | 0.41 | 0.45 | 0.84 | AA bonded |
| 1231 | AB | two | 0.47 | 0.45 | 0.82 | AB bonded |
| 1301 | ABB | three | 0.31 | 0.33 | 0.88 | AA bonded |
| 812 | AB | two | 0.92 | 0.39 | 0.73 | adsorbed |
| 908 | ABB | three | 0.65 | 0.3 | 0.81 | AB bonded |
| 997 | ABB | three | 0.28 | 0.31 | 0.83 | AA bonded |
| 1040 | A | one | 0.81 | 0.65 | 0.00 | adsorbed |
| 1017 | AB | two | 0.48 | 0.42 | 0.77 | AB bonded |

-continued

Table of Exemplars

| T (° K.) | Type | No. | $\rho_{rand}$ | $\rho_{aa}$ | $\rho_{ab}$ | State |
|---|---|---|---|---|---|---|
| 903 | AAB | three | 0.34 | 0.55 | 0.27 | AA bonded |
| 996 | AAB | three | 0.46 | 0.57 | 0.28 | AA bonded |
| 859 | AAB | three | 0.55 | 0.55 | 0.27 | AA bonded |
| 1161 | AB | two | 0.91 | 0.44 | 0.81 | adsorbed |
| 761 | AB | two | 0.62 | 0.38 | 0.72 | AB bonded |
| 877 | ABB | three | 0.08 | 0.29 | 0.81 | AA bonded |
| 1097 | B | one | 0.6 | 0 | 0.67 | AB bonded |
| 1035 | A | one | 0l.55 | 0.65 | 0.00 | AA bonded |
| 899 | ABB | three | 0.11 | 0.3 | 0.81 | AA bonded |
| 943 | ABB | three | 0.15 | 0.3 | 0.82 | AA bonded |
| 1156 | AAB | three | 0.73 | 0.59 | 0.29 | adsorbed |
| 1182 | A | one | 0.85 | 0.7 | 0.00 | adsorbed |
| 781 | ABB | three | 0.41 | 0.28 | 0.79 | AB bonded |
| 1024 | AB | two | 0.3 | 0.42 | 0.77 | AA bonded |
| 785 | B | one | 0.26 | 0 | 0.58 | AB bonded |
| 1171 | AB | two | 0.87 | 0.44 | 0.81 | adsorbed |
| 1056 | B | one | 0.94 | 0 | 0.66 | adsorbed |
| 1213 | AAB | three | 0.43 | 0.6 | 0.29 | AA bonded |
| 1332 | A | one | 0.29 | 0.75 | 0.00 | AA bonded |
| 762 | AAB | three | 0.09 | 0.54 | 0.26 | AB bonded |
| 1019 | AAB | three | 0.85 | 0.57 | 0.28 | adsorbed |
| 786 | AB | two | 0.92 | 0.38 | 0.72 | adsorbed |
| 764 | AAB | three | 0.66 | 0.54 | 0.26 | adsorbed |
| 1088 | AB | two | 0.72 | 0.43 | 0.79 | AB bonded |
| 1395 | AB | two | 0.99 | 0.45 | 0.85 | adsorbed |
| 1120 | AB | two | 0.43 | 0.43 | 0.80 | AA bonded |
| 1121 | B | one | 0.83 | 0 | 0.68 | adsorbed |
| 736 | A | one | 0.02 | 0.57 | 0.00 | vapor |
| 1208 | B | one | 0.9 | 0 | 0.71 | adsorbed |

An example suitable neural network is described in U.S. patent application Ser. No. 09/326,441, by Yang Cao et al., filed Jun. 4, 1999, titled "Orthogonal Functional Basis Method Approximation," which is incorporated by reference into description. With the Orthogonal Functional Basis neutral network, a self-architecting neural network, using a randomly generated number and type of orthogonal basis, a partial least squares regression with regularization and cross-validation achieves the desired mapping within a prescribed mean square errors. The process may be similarly applied with other neural network methodologies.

An important aspect of this process is the critical need to identify appropriate variables to use in the training set. A particular problem is identifying variables that will permit reducing the total number of variables to a more computationally tractable number.

The sequence involved in the formulation of the CA for modeling film-substrate interaction begins with the definition of the substrate, i.e., the constituent materials and their crystalline structure. Once the substrate is defined, the vapor material, together with incident angle and energy must be specified. Then the sequence of coordinates and starting states is generated to populate the CA with both physical and chemical information regarding the vapor and substrate materials. Once the CA is populated, the film-substrate interaction is simulated exercising the state change algorithm, as approximated with the self-architecting neural network and displayed to the user on a computer screen for purposes of visualization.

The coupling of the CA state change algorithm and the self-architecting neural network is accomplished as follows. The CA-like algorithm considers atoms or objects in the source and applies rules of motion (to coordinate change) to an atom or object in the source, allowing it to move from the source into the vapor space portion of the cellular space. The motion may be strongly or weakly directed to insure motion toward the substrate, or the motion may be entirely random. In any case, the object via these rules randomly walks toward the substrate.

When an object enters the interface between the vapor and the substrate, the interface algorithm activates. The state of the object at this point is "adsorbed," that is, it is free to interact or move from the site. The self-architecting neural network is used to predict the state based on the input data given a random number in the closed interval [0,1] and probabilities associated with the barrier energies calculated as described previously.

Once the state has been determined, the attributes of each object (atom) involved in a state change are transformed accordingly. The evaluation of a state change is predicated on an atom impinging on a cell at the surface of the substrate. The order of cell evaluation is predicated on the temporal sequence of randomly selected atoms form the vapor being deposited on the substrate. Additional changes of state associated with surface diffusion, defects, dopants, special morphologies such as grain boundaries, second phases and precipitates are introduced at this point in the cycle. Additional decision algorithms for each of these are used to determined determine the final state of the object. If none of these algorithms are included, then the cell state cycle is complete. This cycle is repeated N times, where N is the number of source atoms or objects. A main cycle is then completed and the configuration can be rendered and displayed on a computer screen. The main cycle is repeated until all objects have reached a bonded state, at which stage the simulation is complete or the user terminates the simulation. Provision to stop the main cycle at any stage is made in the algorithm in order to abort the simulation, to determine intermediate morphologies of the film, to generate a computer movie of the simulation or to accomplish some other purpose.

When the training and test sets have been created, they are used by the self-architecting neural network to generate a system of weights that are used for predicting the state given a set of inputs. The self-architecting neural network architecture will be optimized for time efficiency of both the training time, the accuracy and the speed of the testing predictions. The purpose, and novel contribution, in using the self-architecting prediction systems is to reduce the time for state determination to as small a value as possible in order to simulate the state determination of as many as 1,000,000 atoms/sec. on a desktop size computer, while allowing compute time for rendering and display of the film-substrate system in real-time as the simulation is run.

The impact of coupling a CA-like state machine, state change algorithm and self-architecting neural network is to provide a researcher or practitioner a means for simulating a recipe for a multi-layer and/or gradient thin-film coating to determine if the selected process conditions will yield the required thickness, composition/stoichiometry and morphology to provide desired film properties such as wear life, conductance, lubriciousness and so forth.

To summarize, the cellular automaton concept is extended to include variable sets of rules for each cell. The collection of rules is the basis of a state change algorithm. The state change engine takes the coordinates of a substrate set of atoms or other objects and the coordinates of a free atom or object and causes these free object coordinates to change. When the free object is next to the substrate object, the algorithm determines possible change of coordinates and state of the free object. When the new coordinates have been determined, a new free object is considered. This process continues until all free objects have become part of the original substrate, thereby creating a film. A self-architecting neural network is used to reduce the computational burden of the algorithm by being trained on a statistically significant set of possible free object substrate configurations and tested by predicting known states.

The disclosed method for functional approximation successfully demonstrates the advantages of combining cellular automata with a neural network to make the cellular automaton system solution process more tractable. Although the specifically disclosed invention is specialized, its teachings will find application in other areas where computational analysis is required. Such other areas may include, but are not limited to, metallurgical problems such as steel making.

Those with skill in the art of the invention will readily see other uses for the disclosed invention in addition to the specifically described thin-film formation and growth process. For example, in addition to its use for modeling other processes, other computationally complex modeling methods, such as finite element analysis, may have a subprocess or subprocesses of that method replaced by one or more neural networks that have been trained by a more traditional computationally complex versions of those subprocesses. It is understood, therefore, that other modifications to the invention may be made, as might occur to one with skill in the field of this invention, within the scope of the appended claims. All embodiments contemplated have not been shown in complete detail. Other embodiments may be developed without departing from the spirit of this invention or from the scope of the claims.

We claim:

1. A method for modeling thin-film formation and growth, comprising the steps of:
   (a) creating a model of the thin-film formation and growth with a cellular automaton system having variable rules for each cell, wherein the rules include at least one state change algorithm;
   (b) next, creating a training set of solutions for a neural network from the at least one state change algorithm;
   (c) next, training a neural network with the created training set of solutions; and, (d) next, using the trained neural network in fixed place of the at least one state change algorithm during operation of the model.

2. A method for modeling a dynamic process, comprising the steps of:
   (a) creating a model of the dynamic process with a cellular automaton system having variable rules for each cell, wherein the rules include at least one algorithm;
   (b) next, creating a training set of solutions for a neural network from the at least one algorithm;
   (c) next, training a neural network with the created straining set of solutions; and,
   (d) next, using the trained neural network in fixed place of the at least one algorithm during operation of the model.

3. A method for modeling a dynamic process, comprising the steps of:
   (a) creating a model of the dynamic process with a computationally complex method, wherein the computationally complex method includes a computationally complex subprocess;
   (b) next, creating a training set of solutions for a neural network from the computationally complex subprocess;
   (c) next, training a neural network with the created training set of solutions; and,
   (d) next, using the trained neural network in fixed place of the computationally complex subprocess during operation of the computationally complex model.

* * * * *